US009238456B2

(12) United States Patent
Jeon

(10) Patent No.: US 9,238,456 B2
(45) Date of Patent: Jan. 19, 2016

(54) APPARATUS AND METHOD FOR WARNING AGAINST LACK OF STROKE FOR ELECTRONIC PARKING BRAKE

(71) Applicant: HYUNDAI MOBIS CO., LTD., Seoul (KR)

(72) Inventor: Jae Woo Jeon, Seongnam-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/447,406

(22) Filed: Jul. 30, 2014

(65) Prior Publication Data

US 2015/0217746 A1 Aug. 6, 2015

(30) Foreign Application Priority Data

Feb. 5, 2014 (KR) ........................ 10-2014-0013283

(51) Int. Cl.
| | | |
|---|---|---|
| *B60T 17/22* | (2006.01) | |
| *F16D 65/14* | (2006.01) | |
| *F16D 65/18* | (2006.01) | |
| *F16D 66/02* | (2006.01) | |
| *F16D 121/24* | (2012.01) | |
| *F16D 125/40* | (2012.01) | |

(52) U.S. Cl.
CPC ................. *B60T 17/22* (2013.01); *F16D 65/14* (2013.01); *F16D 65/18* (2013.01); *F16D 66/025* (2013.01); *F16D 2121/24* (2013.01); *F16D 2125/40* (2013.01)

(58) Field of Classification Search
CPC ... B60T 13/746; B60T 11/046; B60T 13/662; B60T 13/741; B60T 8/267; F16D 2121/24; F16D 2123/00; F16D 2125/40; F16D 2125/66; F16D 2127/06; F16D 2127/10; F16D 65/18; F16H 2061/0485; F16H 2061/0488; F16H 59/72; F16H 61/0437; Y10T 477/653; Y10T 477/6895; Y10T 477/75; Y10T 477/78
USPC .................... 701/70; 477/174; 188/72.7, 158; 192/103 F, 222; 303/152

See application file for complete search history.

(56) References Cited

U.S. PATENT DOCUMENTS

| | | | | |
|---|---|---|---|---|
| 6,889,804 B2 * | 5/2005 | Inoue | ................... | F16D 48/066 192/103 F |
| 2002/0098945 A1 * | 7/2002 | Kwon | .................. | F16H 1/0437 477/174 |
| 2009/0071769 A1 * | 3/2009 | Cheon | .................. | B60T 13/741 188/72.7 |
| 2009/0099748 A1 * | 4/2009 | Watanabe | ............. | B60T 13/746 701/70 |
| 2009/0152071 A1 * | 6/2009 | Jeon | ....................... | B60T 13/746 192/222 |

(Continued)

FOREIGN PATENT DOCUMENTS

| | | | |
|---|---|---|---|
| JP | 2000289626 A | * | 10/2000 |
| KR | 1996-0022048 A | | 7/1996 |

*Primary Examiner* — James Trammell
*Assistant Examiner* — Sanjeev Malhotra
(74) *Attorney, Agent, or Firm* — Knobbe Martens Olson & Bear LLP

(57) ABSTRACT

An apparatus for warning against lack of stroke in an electronic parking brake may include: a tension sensor for sensing the tension of a cable which is provided in an actuator so as to transmit power; a motor for providing power to the actuator; and a controller for controlling whether to operate the motor based on the sensed tension of the cable and a preset target tension, and calculating an operating stroke of the actuator based on an operating time of the motor. The controller may issue a stroke lack warning based on the operating stroke and a preset critical stroke.

12 Claims, 2 Drawing Sheets

(56) References Cited

U.S. PATENT DOCUMENTS

2009/0256417 A1* 10/2009 Ishii ................ B60T 8/267 303/152

2011/0024243 A1* 2/2011 Choi ................ B60T 13/746 188/158

* cited by examiner

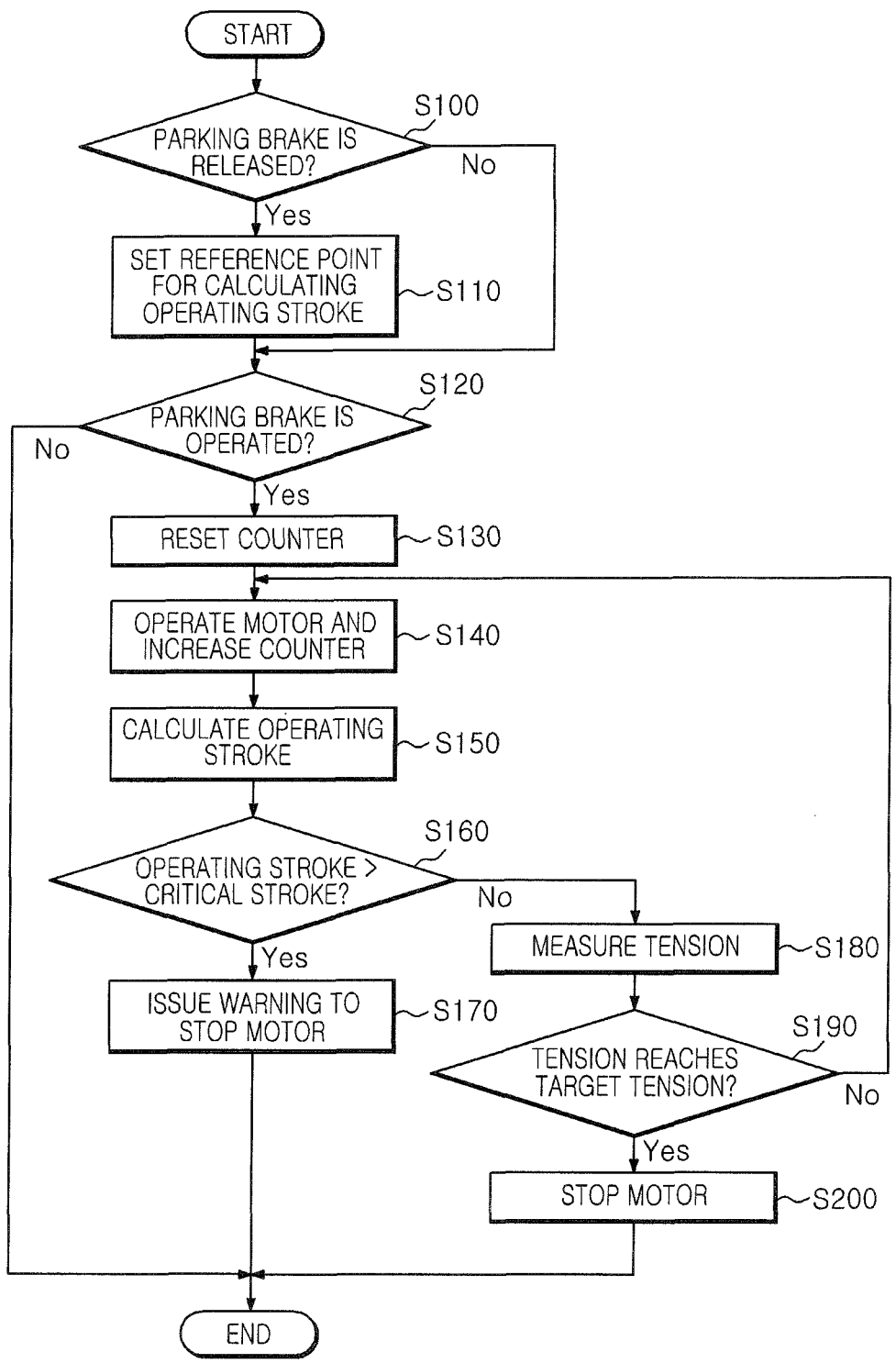

APPARATUS AND METHOD FOR WARNING AGAINST LACK OF STROKE FOR ELECTRONIC PARKING BRAKE

CROSS-REFERENCES TO RELATED APPLICATIONS

The present application claims priority to Korean application number 10-2014-0013283, filed on Feb. 5, 2014, which is incorporated by reference in its entirety.

BACKGROUND OF THE INVENTION

The present invention relates to an apparatus and method for warning against lack of stroke in an electronic parking brake, and more particularly, to an apparatus and method for warning against lack of stroke in an electronic parking brake, which issues a warning against lack of stroke and prevents an additional operation to avoid locking between a nut screw and a bolt screw, when a required stroke becomes larger an operating stroke.

In general, when parking a vehicle, a driver manipulates a parking brake to prevent the movement of the vehicle. In an electronic parking brake system, when the driver makes a request or the state of the vehicle satisfies an automatic fastening condition of the parking brake while the vehicle is parked, an electronic controller for controlling the electronic parking brake drives a motor to supply power to an actuator, and the actuator generates a brake force to maintain the stopped state of the vehicle.

At this time, the actuator may include a bolt screw which is advanced and retreated by the power of the motor and a nut screw which is combined with the bolt screw so as to guide the movement of the bolt screw. As the motor is driven, the bolt screw is advanced to transmit power to the brake mechanism, and the brake mechanism generates a brake force.

Thus, as the bolt screw is further advanced, the brake force of the parking brake may be increased. However, when the bolt screw is excessively advanced to be locked to the nut screw, the actuator may be damaged.

The related art of the present invention is disclosed in Korean Patent Laid-open Publication No. 1996-0022048 published on Jul. 18, 1996 and entitled "Electronic brake system".

SUMMARY OF THE INVENTION

Embodiments of the present invention are directed to an apparatus and method for warning against lack of stroke, which issues a warning against lack of stroke and prevents an additional operation to avoid locking between a nut screw and a bolt screw, when a required stroke becomes larger an operating stroke.

In one embodiment, an apparatus for warning against lack of stroke in an electronic parking brake may include: a tension sensor for sensing the tension of a cable which is provided in an actuator so as to transmit power; a motor for providing power to the actuator; and a controller for controlling whether to operate the motor based on the sensed tension of the cable and a preset target tension, and calculating an operating stroke of the actuator based on an operating time of the motor. The controller may issue a stroke lack warning based on the operating stroke and a preset critical stroke.

When a parking brake operation command is inputted, the controller may operate the motor until the tension of the cable reaches the target tension.

The controller may increase a counter at each predetermined time interval while the motor is operated, in response to a clock signal generated at the predetermined time interval, and calculate the operating stroke by multiplying the counter value by a preset duty value.

The controller may set the position of a bolt screw provided in the actuator, at the time at which the release of the parking brake is normally completed, to a reference point for calculating the operating stroke, and reset the counter at the time at which the motor is activated, when the bolt screw is positioned at the reference point.

When the operating stroke exceeds the critical stroke, the controller may issue the stroke lack warning and stops the operation of the motor.

In another embodiment, a method for warning against lack of stroke in an electronic parking brake may include: operating, by a controller, a motor to provide power to an actuator when a parking brake is operated; increasing, by the controller, a counter at each predetermined time interval; calculating, by the controller, an operating stroke based on the counter value; and issuing, by the controller, a stroke lack warning based on the operating stroke and a preset critical stroke.

The method may further include: setting, by the controller, the position of a bolt screw provided in the actuator, at the time at which the release of the parking brake is normally completed, to a reference point for calculating the operating stroke; and resetting the counter.

The method may further include: measuring, by a tension sensor, the tension of a cable which is provided on the actuator so as to transmit power; determining, by the controller, whether the sensed tension of the cable reaches a preset target tension; and stopping, by the controller, the operation of the motor when determining that the tension of the cable reached the target tension.

In the calculating of the operating stroke, the controller may calculate the operating stroke by multiplying the counter value by a preset duty value.

In the issuing of the stroke lack warning, the controller may issue the stroke lack warning and stops the operation of the motor, when the operating stroke exceeds the critical stroke.

BRIEF DESCRIPTION OF THE DRAWINGS

FIG. 2 is a flowchart illustrating a method for warning against lack of stroke in an electronic parking brake system in accordance with the embodiment of the present invention.

DESCRIPTION OF SPECIFIC EMBODIMENTS

Figure 1:
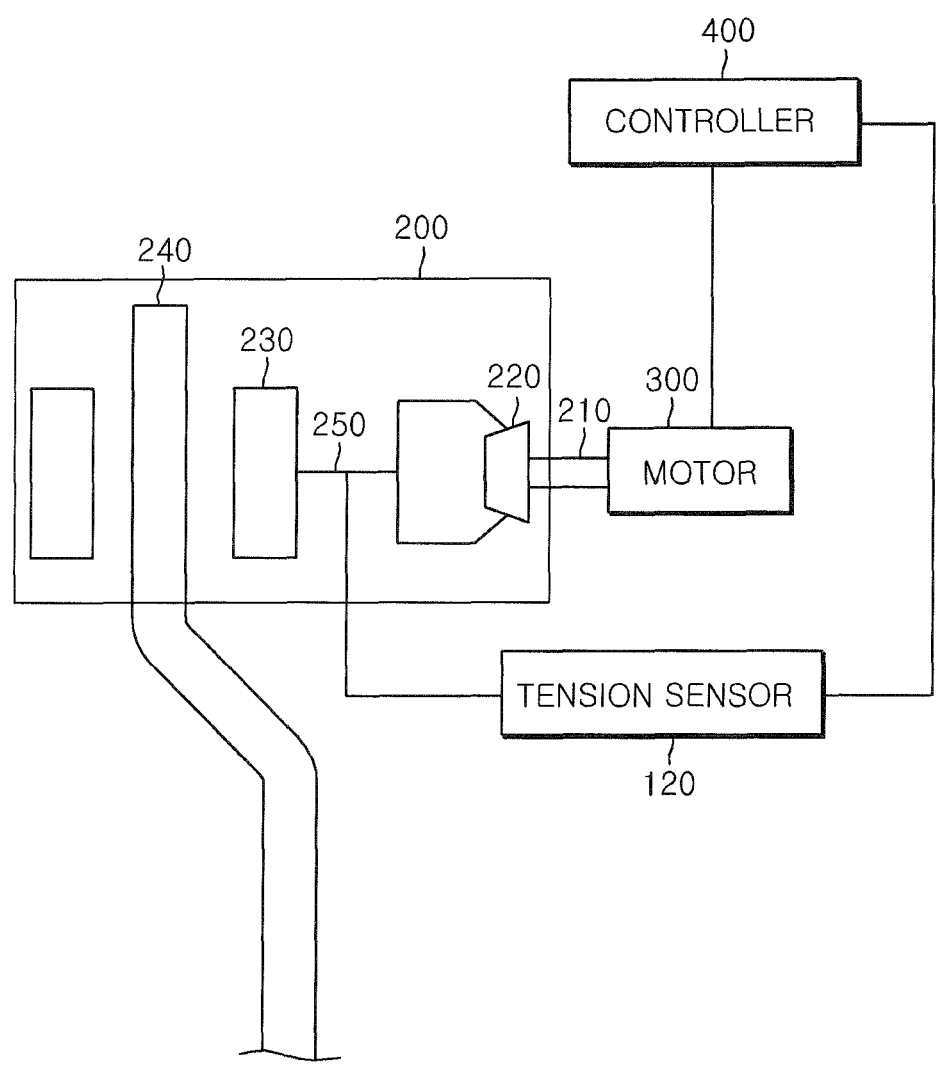
FIG. 1 is a block diagram of an apparatus for warning against lack of stroke in an electronic parking brake in accordance with an embodiment of the present invention.

Embodiments of the invention will hereinafter be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

FIG. 1 is a block diagram of an apparatus for warning against lack of stroke in an electronic parking brake in accordance with an embodiment of the present invention.

As illustrated in FIG. 1, the apparatus for warning against lack of stroke in an electronic parking brake in accordance with the embodiment of the present invention may include a tension sensor 120, a controller 400, and a motor 300.

When a driver makes a request or the state of a vehicle satisfies an automatic fastening condition of the parking brake in case where the vehicle is parked on the flat ground or slope way, the electronic parking brake system operates the motor 300 to supply power to an actuator 200, in order to obtain a brake force. The actuator 200 may include a bolt screw 210, a nut screw 220, a cable 250, a brake pad 230, and a wheel disk 240. The bolt screw 210 is advanced and retreated by the power of the motor 300, the nut screw 220 is combined with the bolt screw 210 so as to guide the movement of the bolt screw 210. The cable 250 transfers the movement of the bolt screw 210 to a brake pad 230. The brake pad 230 receives the power to press the wheel disk 240, and generates a brake force. The wheel disk 240 is connected to a vehicle wheel and pressed by the brake pad 230 so as to brake the vehicle wheel. That is, when the parking brake is operated, the bolt screw 210 is advanced by the power of the motor 300, and the movement of the bolt screw 210 is transferred to the brake pad 230 through the cable 250. Then, the brake pad 230 presses the wheel disk 240 so as to obtain a brake force. Thus, the brake force of the parking brake may be measured through tension applied to the cable 250, and the electronic parking brake system may determine whether a target brake force is obtained, based on the tension of the cable 250 sensed by the tension sensor 120, and supply power to the actuator 200 through the motor 300 until the target brake force is obtained. At this time, when the bolt screw 210 is excessively advanced to be locked to the nut screw 220, the actuator 200 may be damaged.

The tension sensor 120 senses the tension of the cable 250 included in the actuator 200.

The motor 300 advances the bolt screw 210 of the actuator 200 and provides power to obtain a brake force.

The controller 400 controls whether to operate the motor 300, based on the sensed tension of the cable 250 and preset target tension, and calculates an operating stroke of the actuator 200 based on the operating time of the motor 300. At this time, the controller 400 issues a warning against lack of stroke, based on the operating stroke and a preset critical stroke.

At this time, the controller 400 may measure the operating time of the motor 300 based on the current time measured by a timer sensor (not illustrated), or measure the operating time of the motor 300 by increasing a counter at each predetermined time interval while the motor is operated, in response to a clock signal which is generated inside or outside the controller 400 at the predetermined time interval.

When the bolt screw 210 and the nut screw 220 are locked to each other as described above, the actuator 200 may be damaged. Thus, before the locking occurs, the controller 400 needs to issue a warning against lack of stroke (hereafter, referred to as a stroke lack warning). At this time, the operating stroke indicates a distance by which the bolt screw 210 is advanced while the actuator 200 is operated. The critical stroke indicates the maximum distance by the bolt screw 210 can be stably advanced without locking.

The controller 400 increases the counter at the predetermined time interval while the motor is operated, and calculates an operating stroke by multiplying the counter value by a preset duty value. At this time, the controller 400 may determine whether the predetermined time interval for increasing the counter passed, using the timer sensor (not illustrated), or determine whether the predetermined time interval passed, in response to the clock signal which is generated inside or outside the controller 400 at the predetermined time interval. The duty value is a distance by which the bolt screw 210 is advanced when the motor is operated for the predetermined time interval, and may be previously set and stored in the controller 400. That is, the controller 400 may multiply the duty value by the time which passes from the moment at which the parking brake is activated, and measure the operating stroke corresponding to the distance by which the bolt screw 210 of the actuator 200 is advanced.

Furthermore, the controller 400 may set the position of the bolt screw 210 provided in the actuator 200, at the time at which the release of the parking brake is normally completed, to a reference point for calculating the operating stroke. When the bolt screw 210 is positioned at the reference point and the motor 300 is activated, the controller 400 may reset the counter.

When the parking brake is released, the position to which the bolt screw 210 is retreated is constant at all times. Thus, the position of the bolt screw 210 at the time at which the parking brake is normally released may be set to the reference point for calculating an operating stroke. Furthermore, when the bolt screw 210 is positioned at the reference point for calculating an operating stroke, the controller 400 may reset the counter at the moment at which the parking brake is operated to activate the motor 300, and measure the time for which the motor 300 is operated from the moment at which the motor 300 is activated, thereby measuring the time for which the bolt screw 210 is moved. Since the moving speed of the bolt screw 210 is constant per unit time as described above, the controller 400 may calculate the operating stroke based on the operating time of the motor 300.

In this case, when the operating stroke exceeds the critical stroke, the controller 400 may issue a stroke lack warning and stop the operation of the motor 300.

At this time, when the operating stroke by which the bolt screw 210 is moved exceeds the critical stroke by which the bolt screw 210 can be stably moved, the controller 400 issues a stroke lack warning such that a user prepares for a malfunction of the parking brake and takes a proper measure during maintenance. Furthermore, the controller 400 may stop the operation of the motor 300 to prevent the movement of the bolt screw 210 until the bolt screw 210 exceeds the critical stroke so as to be locked to the nut screw 220.

FIG. 2 is a flowchart illustrating a method for warning against lack of stroke in an electronic parking brake system in accordance with the embodiment of the present invention.

Referring to FIG. 2, the method for warning against lack of stroke in an electronic parking brake system in accordance with the embodiment of the present invention will be described.

First, the controller 400 determines whether the parking brake was normally released, at step S100.

When it is determined at step S100 that the parking brake was normally released, the controller 400 sets the position of the bolt screw 210 provided in the actuator 200, at the time at which the release of the parking brake was normally completed, to a reference point for an operating stroke, at step S110. When it is determined at step S100 that the parking brake was not normally released, the process is ended because the parking brake cannot be operated.

As described above, when the parking brake is released, the position to which the bolt screw 210 is retreated is constant at all times. Thus, the position of the bolt screw 210 at the time at which the parking brake was normally released may be set to the reference point for calculating an operating stroke.

Then, the control unit 400 determines whether a driver operated the parking brake, at step S120. When it is determined at step S120 that the driver did not operate the parking brake, the process is ended because the parking brake does not need to be operated any more.

When it is determined at step S120 that the driver operated the parking brake, the controller 400 resets the counter at step S130.

That is, when the bolt screw 210 is positioned at the reference point for calculating an operating stroke, the controller 400 may operate the parking brake to reset the counter at the moment at which the motor 300 is operated, and measure the time for which the motor 300 is operated from the moment at which the motor 300 is activated, thereby measuring the time for which the bolt screw 210 is moved. Since the moving speed of the bolt screw 210 is constant per unit time as described above, the controller 400 may measure an operating stroke based on the operating time of the motor 300.

Then, the controller 400 operates the motor 300 of the actuator 200, and increases the counter at each predetermined time interval, at step S140. That is, the controller 400 increases the counter whenever the predetermined time interval passes, while the motor 300 is operated. At this time, the controller 400 may determine whether the predetermined time passes, based on the current time sensed by the timer sensor (not illustrated), or determine whether the predetermined time passes, in response to a clock signal which is generated inside or outside the controller 400 at the predetermined time interval.

Then, the controller 400 calculates an operating stroke based on the counter value, at step S150. At this time, the controller 400 may calculate the operating stroke by multiplying the counter value by a preset duty value. As described above, the duty value is a distance by which the bolt screw 210 is advanced when the motor is operated for the predetermined time interval, and may be previously set and stored in the controller 400. That is, the controller 400 may multiply the duty value by the time which passes from the moment at which the parking brake is activated, and thus measure the operating stroke corresponding to the distance by which the bolt screw 210 of the actuator 200 is advanced.

Then, the controller 400 determines whether the operating stroke exceeded the critical stroke, at step S160. As described above, the operating stroke indicates the distance by which the bolt screw 210 is moved while the parking brake is operated, and the critical stroke indicates the maximum distance by which the bolt screw 210 can be stably advanced without locking.

When it is determined at step S160 that the operating stroke exceeded the critical stroke, the controller 400 issues a stroke lack warning to stop the operation of the motor at step S170, and then ends the process. That is, the controller 400 may issue the stroke lack warning based on the operating stroke and the preset critical stroke.

At this time, when the operating stroke by which the bolt screw 210 is moved exceeds the critical stroke by which the bolt screw 210 can be stably moved, the controller 400 issues a stroke lack warning such that a user prepares for a malfunction of the parking brake and takes a proper measure during maintenance. Simultaneously, the controller 400 stops the operation of the motor 300 so as to prevent the movement of the bolt screw 210 until the bolt screw 210 exceeds the critical stroke so as to be locked to the nut screw 220.

When it is determined at step S160 that the operating stroke did not exceed the critical stroke, the controller 400 measures the tension of the cable 250 of the actuator 200, sensed by the tension sensor, at step S180.

Then, the controller 400 determines whether the tension of the cable 250 of the actuator 200 reached preset target tension, at step S190.

When it is determined at step S190 that the tension of the cable 250 reached the target tension, the controller 400 stops the motor 300 of the actuator 200 at step S200, and then ends the process. That is, when it is determined that the tension of the cable 250 reached the target tension, it indicates that the power of the motor 300 is transmitted through the cable 250 and the brake force generated through the wheel disk 240 pressed by the brake pad 230 reached a target brake force. Thus, the controller 400 may stop the control for the actuator 200 so as to stop the motor 300, and end the process.

When it is determined at step S190 that the tension of the cable 250 did not reach the target tension, it indicates that the bolt screw 210 is further advanced to obtain a proper brake force. Thus, the controller 400 may repeat steps S130 to S180 and increase the operating stroke until the tension of the cable 250 reaches the target tension or until the operating stroke exceeds the critical stroke.

In accordance with the embodiments of the present invention, when a required stroke of the electronic parking brake becomes larger than an operating stroke, the apparatus and method for warning against lack of stroke may previously issue a stroke lack warning and stop the operation of the electronic parking brake. Thus, the apparatus and method may not only prevent the locking between the bolt screw and the nut screw and the damage of the actuator of the electronic parking brake, but also reduce the repair cost and the possibility of malfunction of the electronic parking brake.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An electronic parking brake apparatus for a vehicle, comprising:
   a tension sensor configured for sensing a tension of a parking brake cable;
   a parking brake motor configured for providing power to cause a linear movement for pulling the parking brake cable; and
   a controller configured for:
      causing to power the parking brake motor in response to detecting a vehicle driver's operation of a brake,
      computing a stroke of the linear movement,
      determining if the computed stroke is greater than a reference value,
      when it is determined that the computed stroke is smaller than the reference value, further determining if a tension of the parking brake cable reaches a predetermined target value, and
      when it is determined that the tension of the parking brake cable reaches the predetermined target value, causing to stop powering the parking brake motor.

2. The electronic parking brake apparatus of claim 1, wherein, when computing the stroke, the controller is configured to increase a counter at each predetermined time interval while the parking brake motor is operated, in response to a clock signal generated at the predetermined time interval, and calculate the stroke by multiplying the counter value by a preset duty value.

3. The electronic parking brake apparatus of claim 2, wherein the controller is configured to set the position of a bolt screw, at the time at which the release of the parking brake is normally completed, to a reference point for calculating the stroke, and reset the counter at the time at which the parking brake motor is activated, when the bolt screw is positioned at the reference point.

4. The electronic parking brake apparatus of claim 1, wherein the reference value comprises the maximum distance by which a bolt screw is advanced while the bolt screw and a nut screw provided in the parking brake are not locked to each other.

5. The electronic parking brake apparatus of claim 1, wherein the controller is further configured for causing to stop the parking brake motor, when it is determined that the computed stroke exceeds the reference value.

6. A method of operating an electronic parking brake of a vehicle, the method comprising:
  causing to power a parking brake motor in response to detecting a vehicle driver's operation of a parking brake, wherein powering the parking brake motor causes a linear movement for pulling a parking brake cable;
  computing a stroke of the linear movement;
  determining if the computed stroke is greater than a reference value;
  when it is determined that the computed stroke is smaller than the reference value, further determining if a tension of the parking brake cable reaches a predetermined target value; and
  when it is determined that the tension of the parking brake cable reaches the predetermined target value, causing to stop powering the parking brake motor.

7. The method of claim 6, wherein computing the stroke comprises:
  setting, by a controller, the position of a bolt screw provided in the parking brake, at the time at which the release of the parking brake is normally completed, to a reference point for calculating the stroke; and
  resetting the counter.

8. The method of claim 6, further comprising measuring, by a tension sensor, the tension of the parking brake cable.

9. The method of claim 6, wherein computing the stroke comprises:
  increasing, by a controller, a counter at each predetermined time interval;
  calculating the operating stroke by multiplying the counter value by a preset duty value.

10. The method of claim 6, wherein the reference value comprises the maximum distance by which a bolt screw is advanced while the bolt screw and a nut screw provided in the parking brake are not locked to each other.

11. The method of claim 6, further comprising, when it is determined that the computed stroke exceeds the reference value, causing to warn a vehicle driver.

12. The method of claim 6, further comprising, when it is determined that the computed stroke is greater than the reference value, causing to stop powering the parking brake motor.

* * * * *